US012763569B2

(12) United States Patent
Colin et al.

(10) Patent No.: US 12,763,569 B2
(45) Date of Patent: Oct. 13, 2026

(54) THERMAL AND VIBRATION SMART MONITORING AND OUTAGE PREVENTION

(71) Applicant: Schneider Electric USA, Inc., Boston, MA (US)

(72) Inventors: Bruno Colin, Chicago, IL (US); Eduardo Barba Jimenez, Fort Worth, TX (US); Gautham Nagendra, Greenwood, IN (US)

(73) Assignee: SCHNEIDER ELECTRIC USA, INC., Boston, MA (US)

( * ) Notice: Subject to any disclaimer, the term of this patent is extended or adjusted under 35 U.S.C. 154(b) by 153 days.

(21) Appl. No.: 18/665,216

(22) Filed: May 15, 2024

(65) Prior Publication Data

US 2025/0357749 A1 Nov. 20, 2025

(51) Int. Cl.

| | |
|---|---|
| ***H02H 6/00*** | (2006.01) |
| ***G08B 21/18*** | (2006.01) |
| ***G08B 31/00*** | (2006.01) |
| ***H02H 5/04*** | (2006.01) |

(52) U.S. Cl.
CPC ............ *H02H 6/00* (2013.01); *G08B 21/185* (2013.01); *G08B 31/00* (2013.01); *H02H 5/04* (2013.01)

(58) Field of Classification Search
CPC ........ G01H 1/00; G01H 17/00; G08B 21/185; G08B 31/00; H02H 5/04; H02H 6/00
USPC .......................................................... 361/103
See application file for complete search history.

(56) References Cited

U.S. PATENT DOCUMENTS

| | | | |
|---|---|---|---|
| 10,132,692 B2 | 11/2018 | Cano Rodriguez et al. | |
| 2017/0045481 A1* | 2/2017 | Benke | G01N 29/46 |
| 2019/0120890 A1 | 4/2019 | Patel et al. | |
| 2021/0108971 A1 | 4/2021 | Blair | |
| 2021/0373063 A1* | 12/2021 | Gundel | G06N 5/04 |
| 2021/0382098 A1 | 12/2021 | Dudding | |
| 2024/0103098 A1 | 3/2024 | Sadeghnia et al. | |

FOREIGN PATENT DOCUMENTS

| | | |
|---|---|---|
| CN | 106443426 A | 2/2017 |
| CN | 117763324 A | 3/2024 |
| KR | 102604708 B1 | 11/2023 |

OTHER PUBLICATIONS

Extended European Search Report for EP Application No. 25171230.3, dated Sep. 29, 2025, 10 pages.
Extended European Search Report from EP Application No. 25173157.6, dated Oct. 7, 2025, 9 pages.

* cited by examiner

*Primary Examiner* — Kevin J Comber
(74) *Attorney, Agent, or Firm* — Stinson LLP

(57) ABSTRACT

Thermal and vibration smart monitoring system for electrical distribution equipment. A plurality of sensors provide temperature and vibration data associated with busbars or busways of the electrical distribution equipment. A diagnostics processor processes the sensor data and load data, which is representative of an electrical load of the electrical distribution equipment, as inputs to a trained machine learning model to determine a prediction whether a predefined temperature alarm for the electrical distribution equipment will be exceeded at a subsequent moment in time and to generate an electronic or visual notification based on the prediction.

19 Claims, 10 Drawing Sheets

THERMAL AND VIBRATION SMART MONITORING AND OUTAGE PREVENTION

BACKGROUND

In general, a busbar is a conductor that serves as a common electrical connection for two or more circuits. For instance, a busbar is a metallic strip or bar commonly found inside switchgear, panel boards, busway enclosures, and the like for collecting electric power from incoming feeders and distributing it to outgoing feeders. The busbar functions as a centralized electrical junction for all incoming or outgoing electrical currents. A busway is an electrical distribution system consisting of busbars in a protective enclosure and includes devices such as isolators and is usually connected to circuit breakers. In the event of a fault, the circuit breaker trips off and disconnects the faulty section of the busbar from the circuit.

A rise in the operating temperature of a power bus may indicate the presence of corrosion or a loss of integrity at mechanical junctions of the bus, potentially creating an operational failure or safety hazard. As a precaution, temperature sensors are often installed at various locations in electrical distribution, including at circuit breakers and connection points or joints between busbars. An ambient temperature sensor may be used for basic busway monitoring to identify when the temperature within a busway exceeds a temperature threshold for safe operation.

Conventional monitoring merely sets a temperature threshold that attempts to provide sufficient warning to address excessive heat conditions in circuit breakers or busways before an operational failure or fire occurs.

SUMMARY

Aspects of the present disclosure permit smart monitoring of temperatures and self-induced vibrations in electrical distribution components such as circuit breakers and rigid electric load carrying components (e.g., busbars and busways) to reduce outages, especially in low voltage electrical distribution equipment. A machine learned model determines a thermal and vibration normality space and monitors the drift of a circuit breaker or a busway to predict problems in a rigid electric load carrying component. The machine learned model further determines busway degradation from environmental factors (presence of external heat sources, dust accumulation creating a thermal barrier, gradual torque degradation, etc.). By modeling temperature and vibration as a function of ambient conditions and load, the machine learned model predicts what would be normal expected temperature and vibrations associated with busbars and circuit breakers based on the measured ambient conditions and load. Monitoring the drift from normal allows detection of abnormalities in a faster and more accurate way than traditional threshold based monitoring.

In an aspect, a method of thermal and vibration smart monitoring of electrical distribution equipment includes receiving sensor data from a plurality of sensors. The sensor data comprises temperature data associated with one or more busbars or busways of the electrical distribution equipment. The method also includes receiving load data representative of an electrical load in the electrical distribution equipment, processing the sensor data and the load data as material for training machine learning models as as inputs to a trained machine learning model to determine a prediction whether a predefined temperature alarm for the electrical distribution equipment will be exceeded at a subsequent moment in time, and generating an electronic or visual notification based on the prediction.

In another aspect, a thermal smart monitoring system for electrical distribution equipment comprises a plurality of sensors configured to provide sensor data. The sensor data comprising temperature data associated with one or more busbars or busways of the electrical distribution equipment. The system also includes a diagnostics processor receiving and responsive to the sensor data and to load data, which is representative of an electrical load of the electrical distribution equipment, and a memory coupled to the diagnostics processor. The memory stores processor-executable instructions that, when executed, configure the diagnostics processor for processing the sensor data and the load data as inputs to a previously trained machine learning model to determine a prediction whether a predefined temperature alarm for the electrical distribution equipment will be exceeded at a subsequent moment in time and generating an electronic or visual notification based on the prediction.

In yet another aspect, an electrical distribution system comprises one or more busbars configured for supplying power to an electrical load, a plurality of sensors configured to provide sensor data, and a diagnostics processor receiving and responsive to the sensor data and to load data. The sensor data comprises temperature data associated with the one or more busbars and the load data is representative of the electrical load. The system further includes a memory coupled to the diagnostics processor that stores a previously trained machine learned model. When executed by the diagnostics processor, the model processes the sensor data and the load data as inputs to the machine learned model to determine a prediction whether a predefined temperature alarm for the electrical distribution system will be exceeded at a subsequent moment in time and causes an electronic or visual notification to be generated based on the prediction.

Other objects and features of the present invention will be in part apparent and in part pointed out herein.

BRIEF DESCRIPTION OF THE DRAWINGS

Corresponding reference characters indicate corresponding parts throughout the drawings.

DETAILED DESCRIPTION

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

Figure 1:
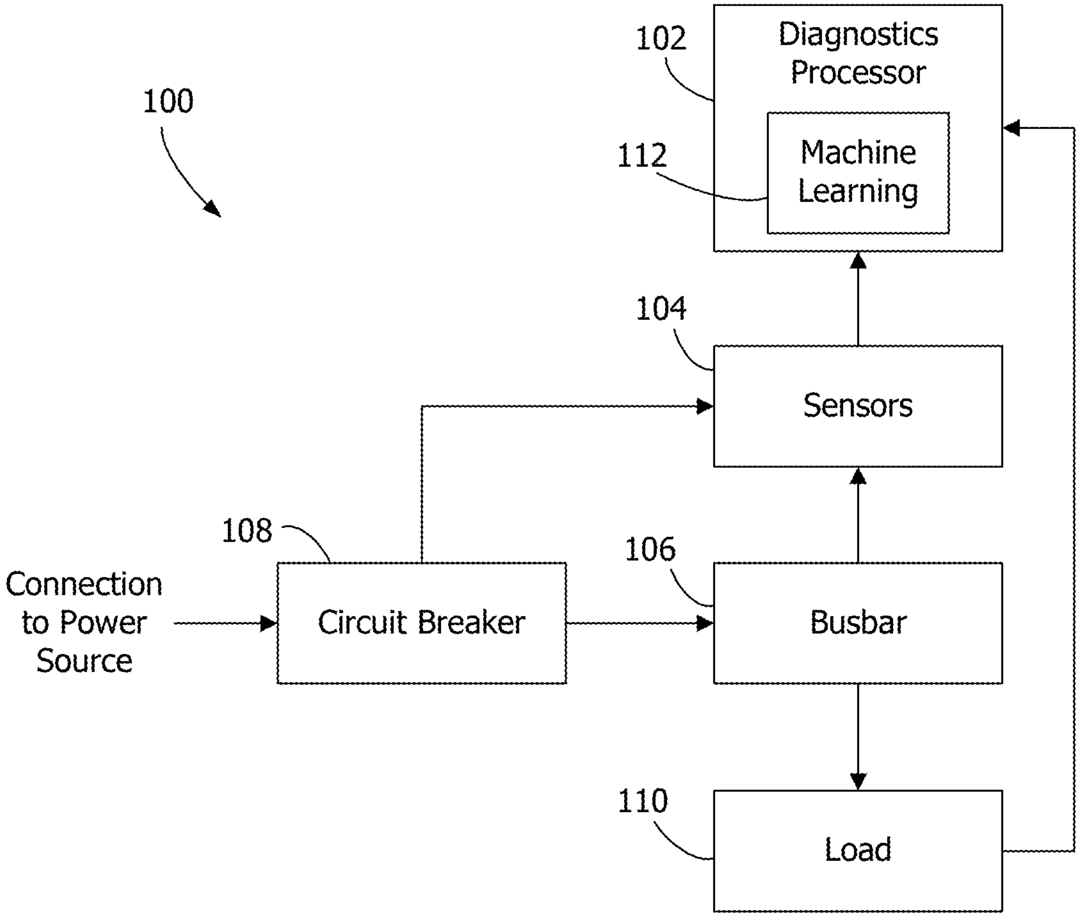
FIG. 1 illustrates a thermal smart monitoring system according to an embodiment.

Referring to FIG. 1, a system 100 combines circuit breaker electronic current sensor capability with temperature and vibration sensors (internal and/or external) to provide specific diagnostics of mechanical connection incidents, thermal anomalies, aging degradation, and the like for electrical distribution equipment such as circuit breakers, switchgears, and busway sections. A diagnostics processor 102, located in the installation or accessed through a cloud connection, receives temperature and/or vibration sensor data from a plurality of sensors 104. In an embodiment, one or more of the sensors 104 are associated with one or more busbars 106 for an instance of electrical distribution equipment. In another embodiment, one or more of the sensors 104 are associated with a circuit breaker 108 electrically connected to the busbar 106. The diagnostics processor 102 also receives load data describing a current electrical load 110 for the electrical distribution equipment embodied by the system 100. In turn, diagnostics processor 102 processes the temperature and vibration sensor data and the load data as inputs to a trained machine learning model 112 to determine a prediction whether a predefined temperature alarm for the electrical distribution equipment will be exceeded at a subsequent moment in time and generates an electronic or visual notification based on the prediction.

In another embodiment, the diagnostics processor 102 of system 100 receives receiving temperature and vibration sensor data from the plurality of sensors 104. In accordance with this embodiment, at least one of the sensors 104 is associated with a mechanical joint of busbar 106 for an instance of electrical distribution equipment. The diagnostics processor 102 also receives load data describing a current electrical load 110 for the electrical distribution equipment embodied by the system 100. During operation of the current electrical load 110, diagnostics processor 102 receives subsequent temperature and/or vibration sensor data from sensors 104. In turn, diagnostics processor 102 processes the temperature and vibration sensor data, the load data, and the subsequent temperature and vibration sensor data to determine whether the subsequent temperature and vibration sensor data significantly deviates from predicted temperature and vibration sensor data expected to be caused by the current electrical load. The diagnostics processor 102 then generates an electronic or visual notification based on the determination.

Figure 2A:
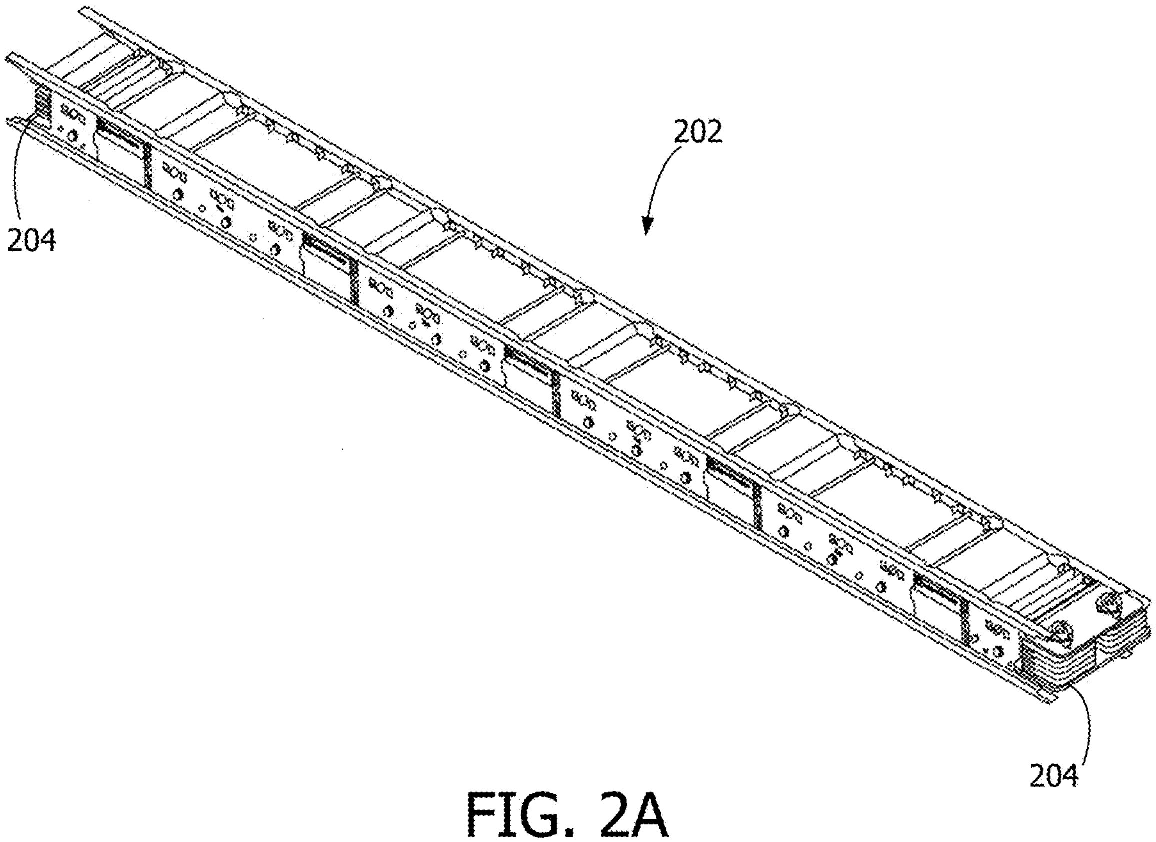
FIG. 2A is a perspective view and FIG. 2B is an end view of a busbar according to an embodiment.
Figure 2B:
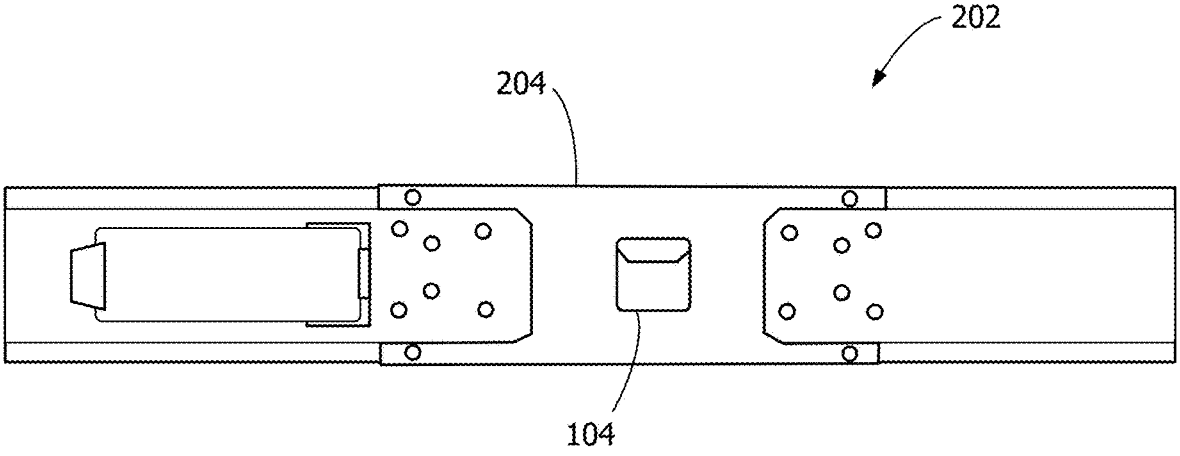

FIG. 2A illustrates a section of a busway 202 having a junction 204 at each end according to one or more embodiments. As is known to those skilled in the art, a busway system carries an electric current and can be typically equipped with one or more sensors 104 at every junction 204. As shown in FIG. 2B, the busway junction 204 is equipped with a vibration and temperature sensor 104. The sensor 104 can be placed next to the junction through various physical means and can use mechanical amplifiers.

Figure 2C:
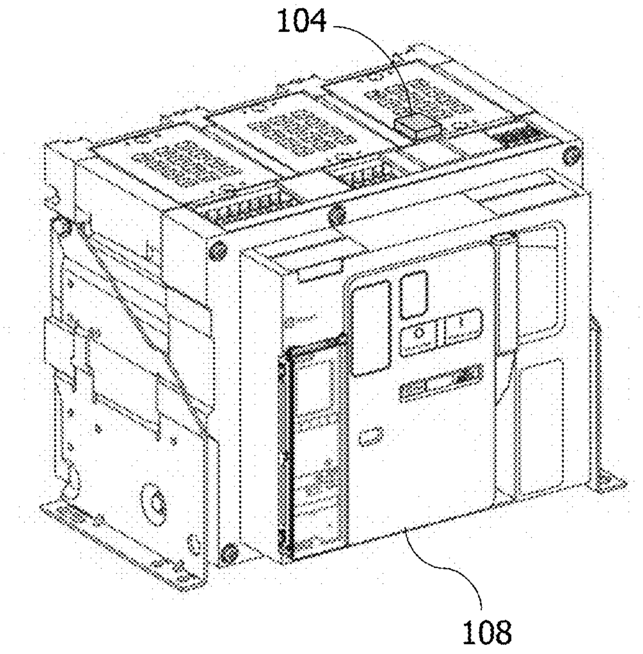
FIG. 2C is a perspective view of a circuit breaker and associated sensor according to an embodiment.

FIG. 2C illustrates an example of circuit breaker 108 equipped with one or more sensors 104, placed in an appropriate location, either internal or external to the envelope of the circuit breaker 108.

Figure 3:
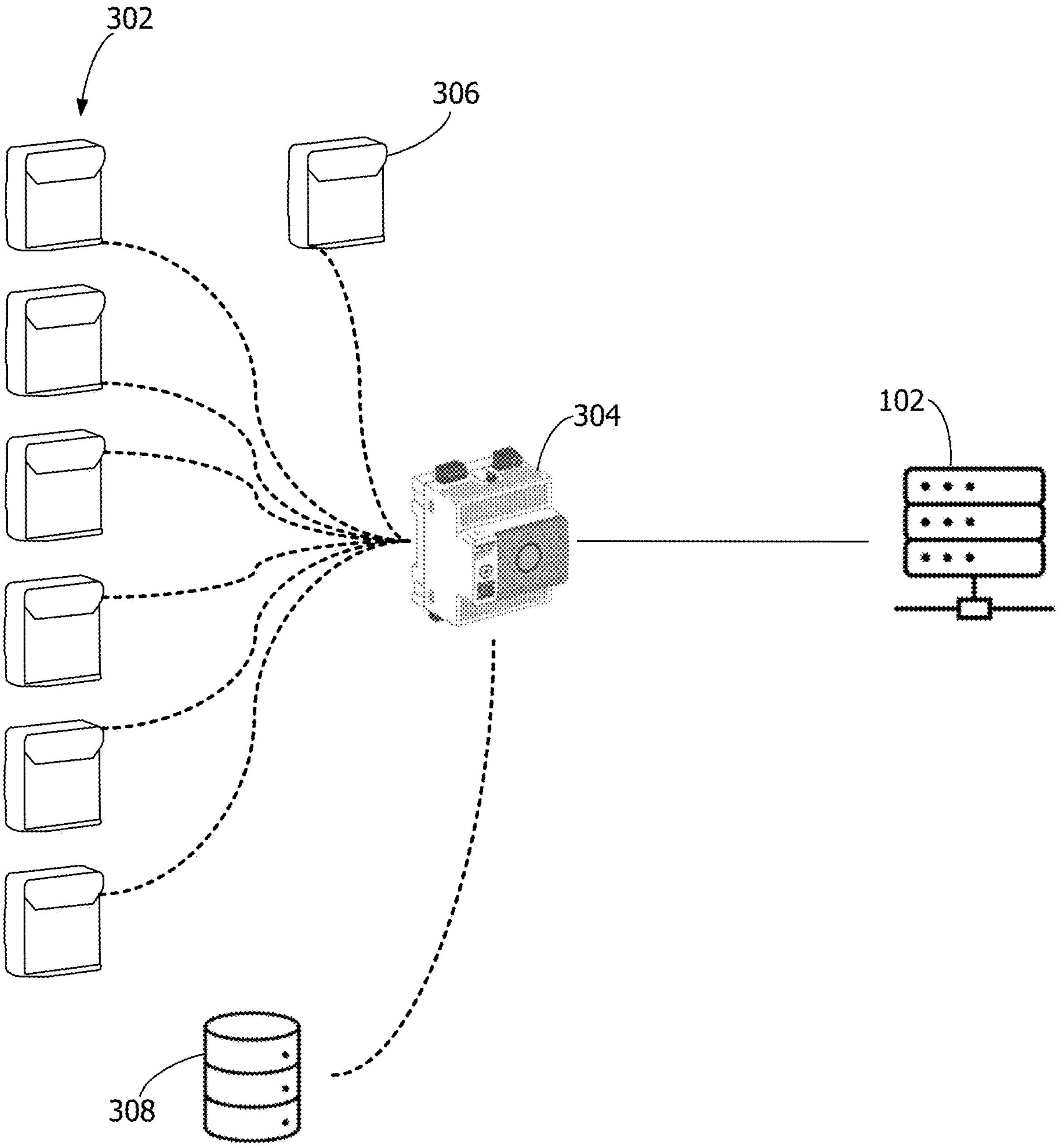
FIG. 3 is a block diagram illustrating networked sensors according to an embodiment.

FIG. 3 illustrates a plurality of sensors 104. In the illustrated embodiment, sensors 104 comprise a plurality of temperature and vibration sensors 302 connected wirelessly to a gateway 304. Alternatively, a wired connection can be used. In addition, an equivalent sensor 306 collects ambient temperature readings. It is to be understood that the plurality of sensor 104, including the sensors 302, 306, may be installed in connection with one or more busbars 106 at various locations, such as joints formed between busbars 106 at their junctions 204 or alternatively located internally or one the external surfaces of circuit breaker 108. The electric current flowing in the busway 202 is collected through existing solutions, stored in a database 308, and provided through the same gateway 304 for processing by diagnostics processor 102 through a wired, wireless, or cloud connection. In an embodiment, the gateway information is stored or processed live.

Figure 4:
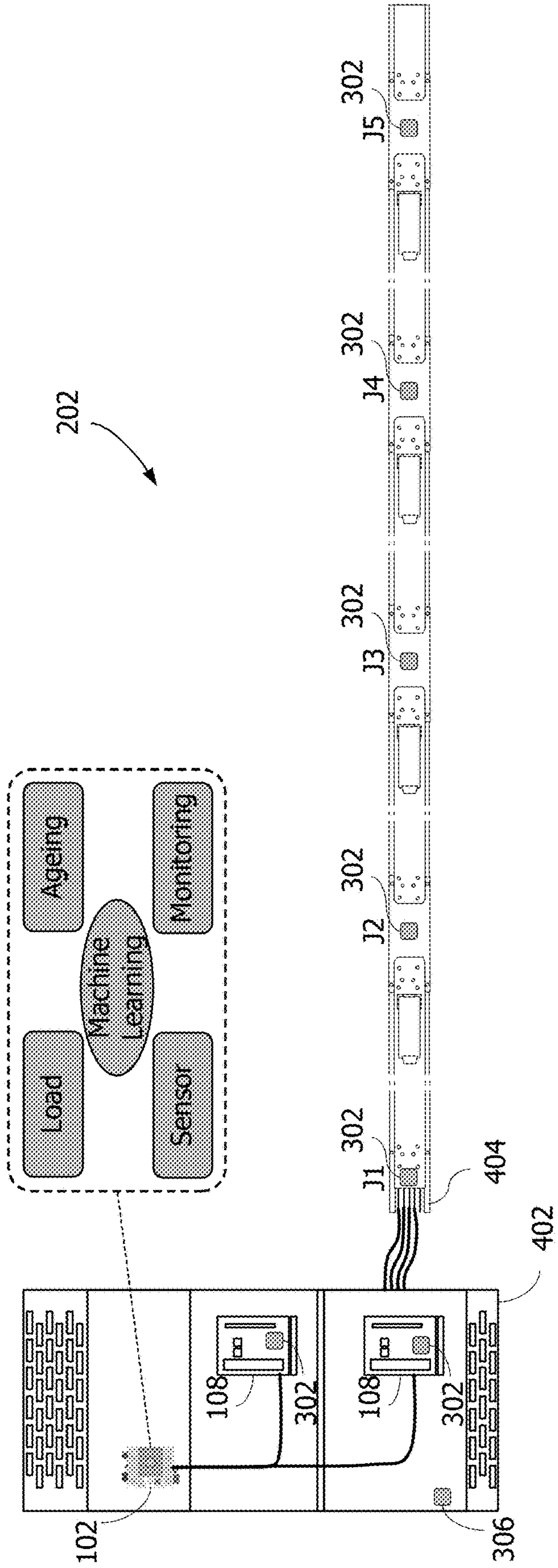
FIG. 4 illustrates an example electrical distribution system employing the thermal smart monitoring system of FIG. 1 according to an embodiment.

Referring to FIG. 4, aspects of the present disclosure include using circuit breaker 108 as a sensor for use in predicting a potential issue with the electrical distribution equipment, including rigid electric load carrying components. In particular, self-induced vibration linked to reaction of ferromagnetic materials under the magnetic fields created by the circuit breaker load can introduce a specific pattern usable for diagnostics of application. The machine learned model 112 executed by diagnostics processor 102 uses data obtained from one or more internal sensors 302 associated with circuit breakers 108 plus data from a plurality of external sensors 302, 306 to access key factors of the application. In FIG. 4, a busway 202 consisting of multiple busbars 106 is shown. The busbars 106 are connected at junctions 204, indicated in this figure at joints J1, J2, J3, etc. Switchgear 402 houses circuit breakers 108 in the illustrated embodiment and busbars 106 are connected to a power source via switchgear 402 and a tap box 404.

The collected temperature and vibration data obtained by sensors 302 located at the bolted connections of busbars 106 may be evaluated to identify problems or potential problems on the busway 202. For example, if a bolted connection at a joint was not properly torqued at the time of installation, the electrical current through the joint between the busbars 106 (e.g., a vertical busbar and a horizontal busbar) may incur a greater electrical resistance due to the poor physical connection. Over time, the bolted connection may begin to lose contact pressure, leading to further corrosion and overheating, potentially creating an operational failure or safety hazard. The vibration and temperature sensors 302 according to one or more embodiments may be used to sense a rise in the operating temperature of the bolted connection, which could indicate a presence of a contact pressure gap or a loss of integrity at the mechanical junction of the busbars 106.

Figure 5:
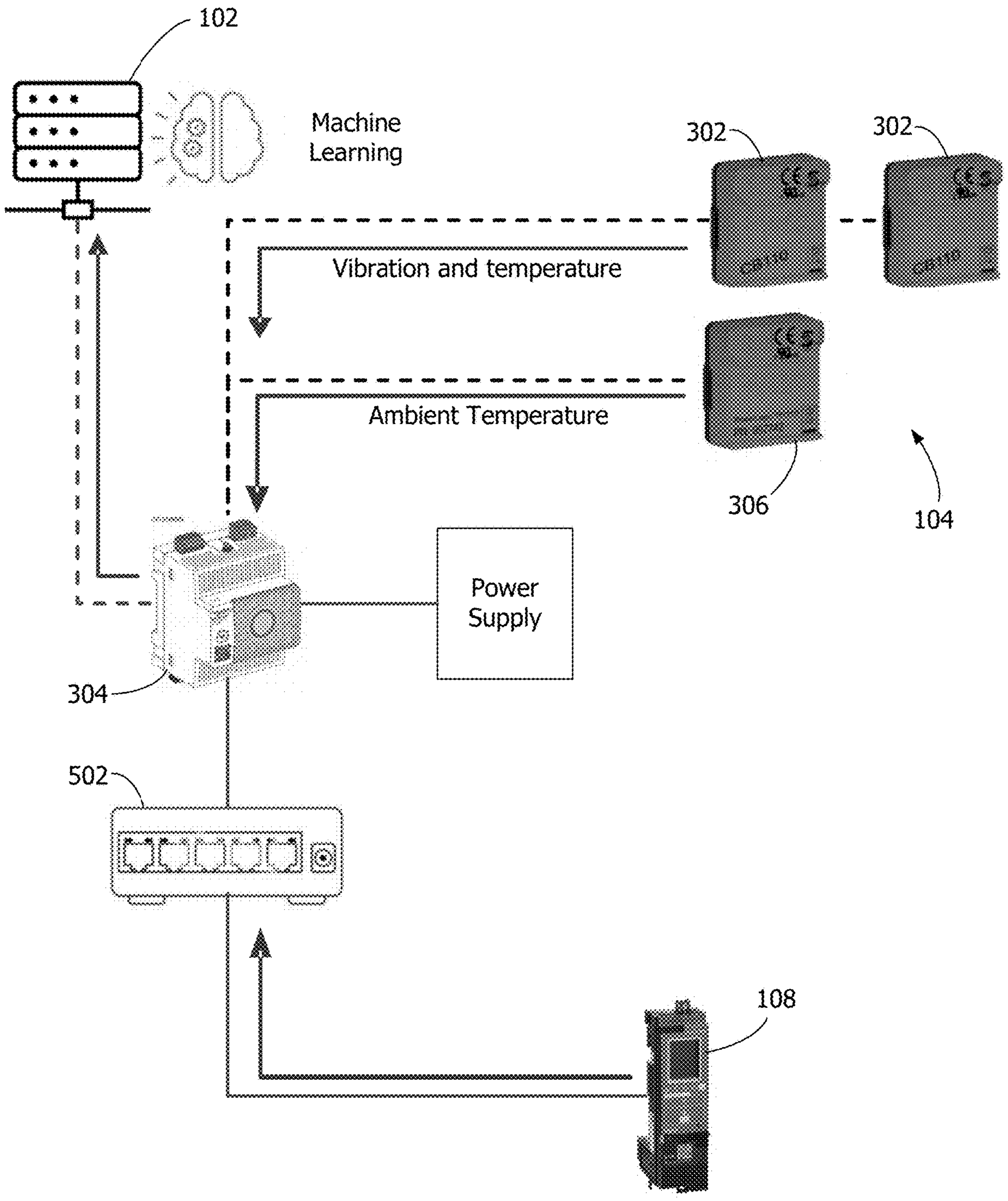
FIG. 5 illustrates an example network for the thermal smart monitoring system of FIG. 1 according to an embodiment.

FIG. 5 illustrates further aspects of the present disclosure. In FIG. 5, current sensors associated with circuit breaker 108 provides load data to diagnostics processor 102 via an Ethernet connection point 502, for example, and the gateway 304. The sensors 302 provide vibration and temperature data and sensor 306 provides ambient temperature data. As shown in the illustrated embodiment, diagnostics processor 102 receives the sensor data via gateway 304 similar to the load data. The diagnostics processor 102 uses the current data provided by circuit breaker 108 and the vibration and temperature data provided by the external sensors 104 to access key factors of application through machine learning, including monitoring for potential problems and aging of components.

Feeding the data captured by this combination of sensors permits the normality space of the circuit breaker 108 or a section of busway 202 (e.g., busbar 106) to be expressed as model temperature and vibration as a function of ambient conditions and load. In other words, the machine learned model executed by diagnostics processor 102 predicts what would be normal, expected temperature and vibrations associated with busbars 106 and/or circuit breakers 108 based on the measured ambient conditions and load. Monitoring the drift of this normality space allows detection of abnormalities in a faster and more accurate way than traditional threshold based monitoring.

At least two direct use cases can be made, namely, A) using the model (e.g., operating point) created to predict the operation of the breaker/busway for different load levels, and anticipating a possible outage due to a brutal stop if current conditions are maintained, thus giving anticipated warning to customer; and B) using the model (e.g., operating point) created to measure a drift away of this operating point (measured temperature drifting away from model predicted temperature).

Use Case A: Prediction of Operation Conditions.

Figure 6A:
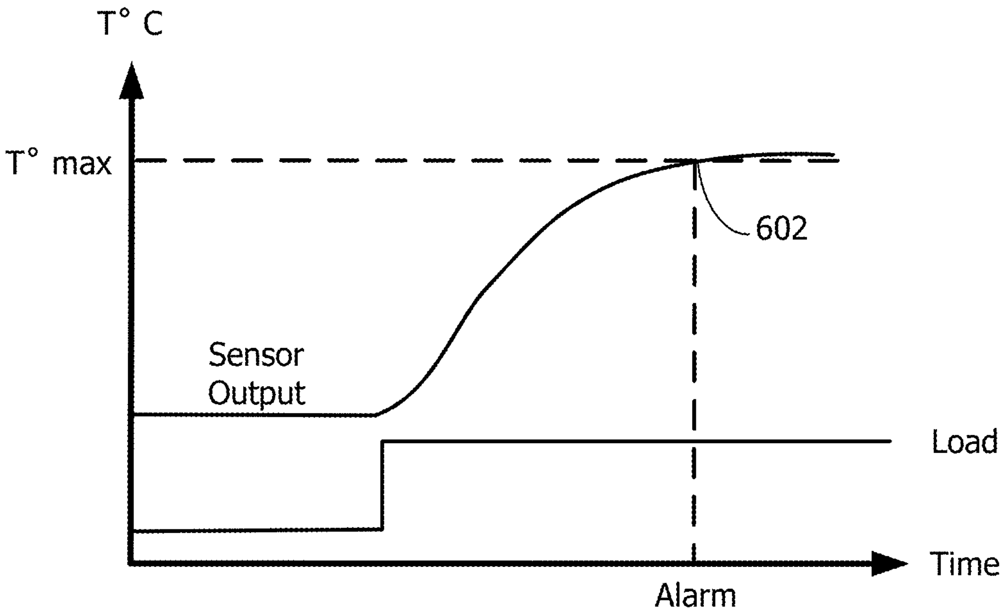
FIGS. 6A and 6B illustrate example thermal response curves for predicting an alarm condition according to an embodiment.

Referring to FIG. 6A, an example of conventional thermal threshold alarming is shown. When the monitored temperature exceeds a threshold Tmax indicating detection of excessive temperature, an alarm is generated at 602.

Figure 6B:
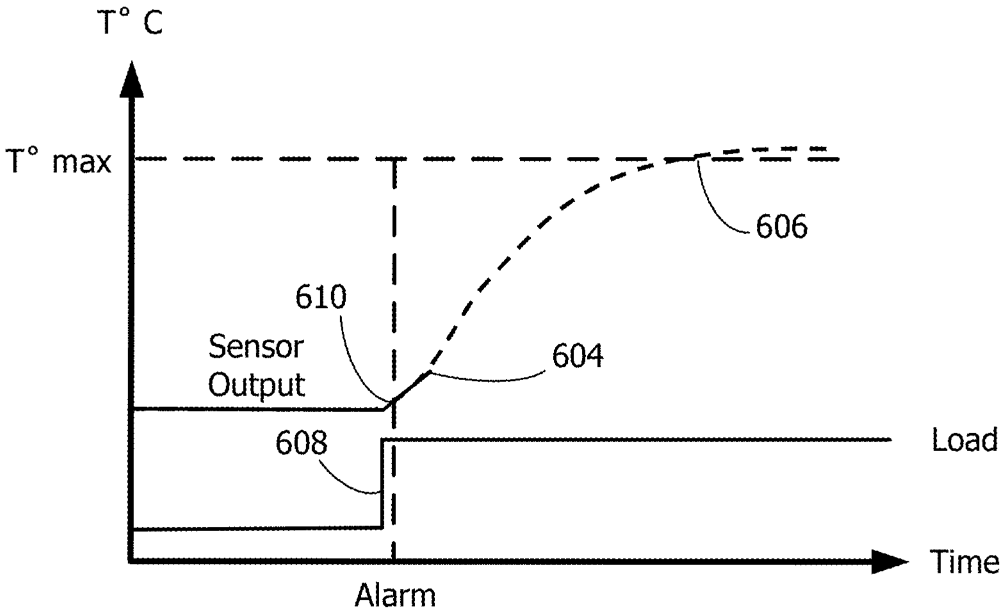

FIG. 6B illustrates an example of predictive alarm management in accordance with one or more embodiments. In this example, limited to temperature for the simplicity of the example, but including vibration and ambient temperature in one or more embodiments, diagnostics processor 102 learns the relationship between load and temperature by monitoring temperature measurements as a function of load and then modeling the temperature, beginning at 604, to predict when the temperature will exceed Tmax at 606. Using the machine learned model, diagnostics processor 102 is able to predict the temperature response to a new load at 608 and generate an alarm at 610 anticipating the excessive temperature condition. In this manner, aspects of the present disclosure permit a much longer window of time for evaluating and possibly resolving the problem before it becomes critical.

In addition, the machine learned model permits preventive alarm management. The model learns load patterns (e.g., evaluation of days/times/events triggering high load, such as every Monday morning or during generator test runs) and can generate an alarm before a load increase. In this manner, the model anticipates condition in response to load changes and provides alerts before a condition becomes problematic.

Figure 7:
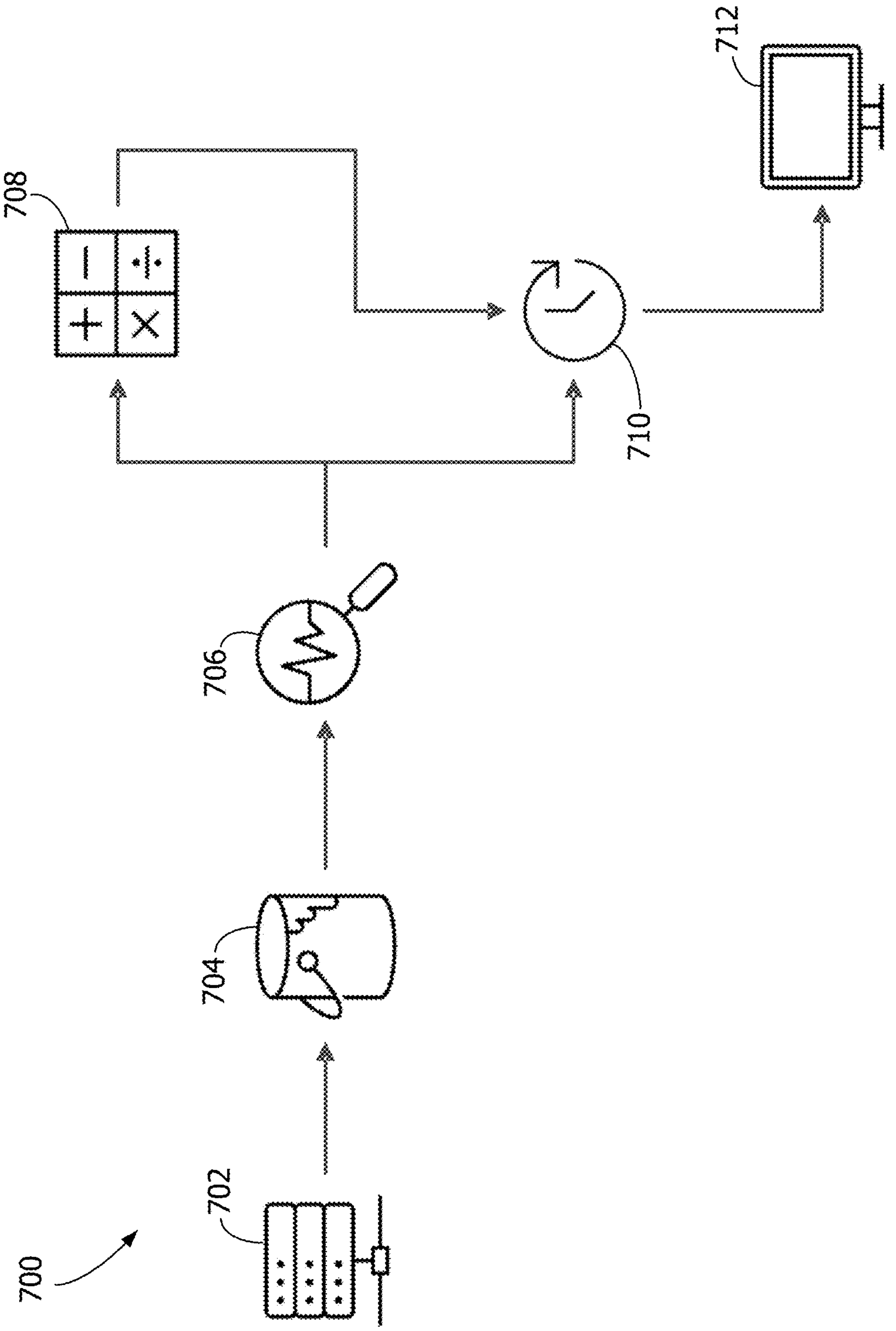
FIG. 7 is a flow diagram of an example process for anticipating a possible outage based on a machined learned model according to an embodiment.

FIG. 7 illustrates an example process 700 for predicting a future state in conjunction with a busway junction pipeline to illustrate further aspects of Use Case A, described above. Beginning at 702, diagnostics processor 102 receives data from sensors 104 for collecting a data set including, for example, time, electric current load, ambient temp, junction temperature, and junction vibration. To improve data processing and speed, the collected data is consolidated at regular intervals (e.g., 1 hour), as indicated by a data bucket at 704. The diagnostics processor 102 executes a machine learning regression algorithm at 706 to establish a specific model for every monitored junction. At 708, the parameters of the machine learned model are stored as an initial normality space and, at 710, diagnostics processor 102 establishes a prediction of temperature and vibration over the next 24 hours, for example, based on the model and live data. The diagnostics processor 102 compares the live temperature and vibration data to the prediction at 712. If the predictions indicate values exceeding pre-established thresholds, an alarm is generated.

Use Case B: Detection of Behavior Drift.

Figure 8A:
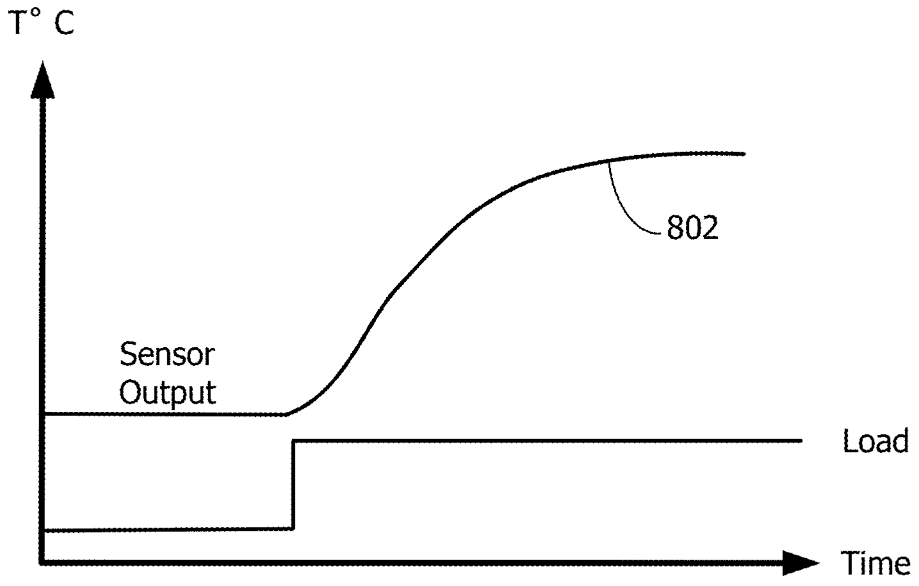
FIGS. 8A and 8B illustrate example thermal response curves for determining normality drift according to an embodiment.

Referring to FIG. 8A, an example of conventional thermal behavior of application is shown at 802 (similar to FIG. 6A).

Figure 8B:
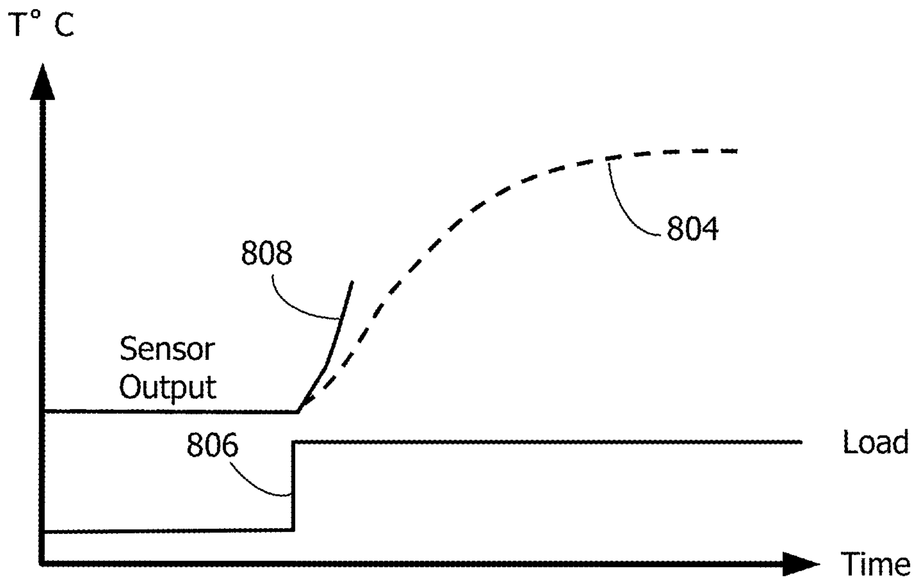

FIG. 8B illustrates an example of predictive alarm management in accordance with one or more embodiments. In this example, limited to temperature for the simplicity of the example, but including vibration and ambient temperature in one or more embodiments, diagnostics processor 102 learns the relationship between load and temperature by monitoring temperature measurements as a function of load, and identifies when the measured (thermal) behavior differs from the expected or usual pattern. Using the machine learned model, diagnostics processor 102 is able to predict the temperature response to a new load at 804. If in response to a new load at 806, the measured thermal behavior deviates significantly from the prediction, as indicated at 808, an alarm is generated based on this change of behavior and a maintenance request may be put in. In this manner, the machine learning of diagnostics processor 102 observes the relationship between load and temperature and compares the observed to predicted to identify abnormal conditions.

Figure 9:
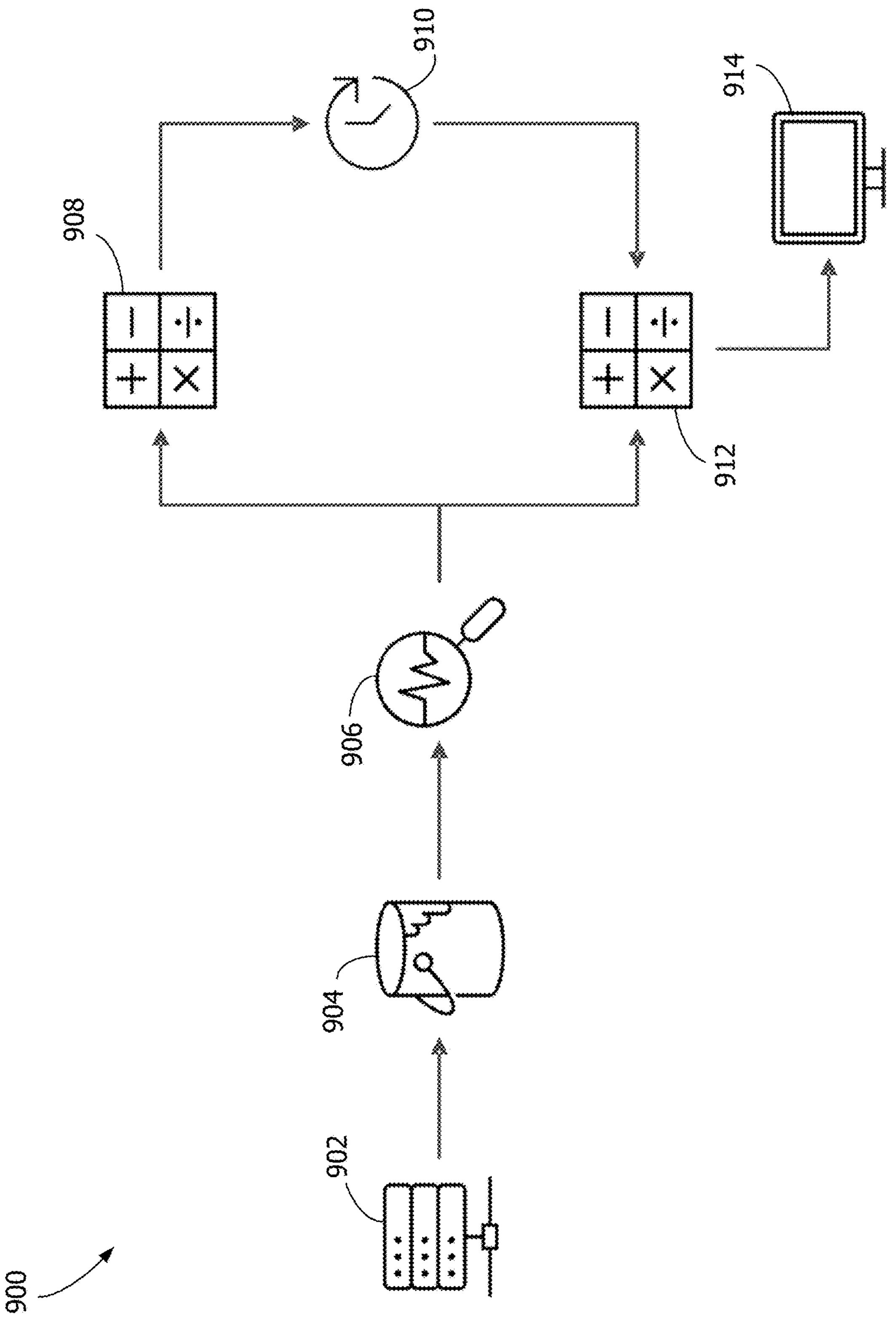
FIG. 9 is a flow diagram of an example process for measuring drift from a normality space based on a machined learned model according to an embodiment.

FIG. 9 illustrates an example process 900 for determining normality space drift in conjunction with a busway junction pipeline to illustrate further aspects of Use Case B, described above. Beginning at 902, diagnostics processor 102 receives data from sensors 104 for collecting a data set including, for example, time, electric current load, ambient temp, junction temperature, and junction vibration. To improve data processing and speed, the collected data is consolidated at regular intervals (e.g., 1 hour), as indicated by a data bucket at 904. The diagnostics processor 102 executes a machine learning regression algorithm at 906 to establish a specific model for every monitored junction. At 908, the parameters of the machine learned model are stored as an initial normality space and, at 910, diagnostics processor 102 establishes a prediction of temperature and vibration based on live load, time, and ambient conditions data. At 912, the process 900 operates on the model and live data. The diagnostics processor 102 compares the live temperature and vibration data to the prediction at 914. If the comparison reveals drift exceeding pre-established thresholds, an alarm is generated.

Aspects of the present disclosure permit monitoring of temperatures and self-induced vibrations in circuit breakers and busways. A machine learned model determines a thermal and vibration normality space and monitors the drift of a circuit breaker or a busway to predict degradations in a circuit breaker or in a busway. The machine learned model further determines busway degradation from environmental factors (presence of external heat sources, dust accumulation creating a thermal barrier, gradual torque degradation, etc.). By modeling temperature and vibration as a function of ambient conditions and load, the machine learned model predicts what would be normal expected temperature and vibrations associated with busbars and circuit breakers based on the measured ambient conditions and load. Monitoring the drift from normal allows detection of abnormalities in a faster and more accurate way than traditional threshold based monitoring.

Although described with respect to busbars and busways, it is to be understood that aspects of the present disclosure permit thermal and vibration smart monitoring of any rigid electric load carrying component.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A method of thermal and vibration smart monitoring of electrical distribution equipment, the electrical distribution equipment including one or more rigid electric load carrying components, the method comprising:

receiving sensor data from a plurality of sensors, wherein the sensor data comprises temperature data associated with the one or more rigid electric load carrying components and vibration data indicating a self-induced vibration of the one or more rigid electric load carrying components;

receiving load data representative of an electrical load of the electrical distribution equipment;

processing the sensor data and the load data as inputs to a trained machine learning model to determine a prediction whether a predefined temperature alarm for the electrical distribution equipment will be exceeded at a subsequent moment in time; and generating a notification based on the prediction.

2. The method of claim 1, wherein the electrical distribution equipment includes one or more circuit breakers and wherein the sensor data further comprises temperature data associated with the one or more circuit breakers.

3. The method of claim 2, wherein the sensor data further comprises vibration data associated with the one or more circuit breakers.

4. The method of claim 1, wherein the sensor data further comprises environmental data associated with ambient conditions of the electrical distribution equipment, and wherein processing the sensor data and the load data comprises modeling temperature and vibration of the electrical distribution equipment as a function of the ambient conditions and the electrical load.

5. The method of claim 4, wherein modeling the temperature and vibration of the electrical distribution equipment comprises defining, based on the received sensor data and load data, a predicted temperature and vibration response of the electrical distribution equipment over time in response to the ambient conditions and the electrical load.

6. The method of claim 5, further comprising defining a normality space associated with the electrical distribution equipment from the predicted temperature and vibration response, and wherein processing the sensor data and the load data comprises comparing the normality space to a temperature threshold corresponding to the predefined temperature alarm.

7. A thermal and vibration smart monitoring system for electrical distribution equipment, the electrical distribution equipment including one or more rigid electric load carrying components, the system comprising:

a plurality of sensors configured to provide sensor data, the sensor data comprising temperature data associated with the one or more rigid electric load carrying components and vibration data indicating a self-induced vibration of the one or more rigid electric load carrying components;

a diagnostics processor receiving and responsive to the sensor data and to load data, the load data representative of an electrical load of the electrical distribution equipment; and a memory coupled to the diagnostics processor, the memory storing processor-executable instructions that, when executed, configure the diagnostics processor for:

processing the sensor data and the load data as inputs to a trained machine learning model to determine a prediction whether a predefined temperature alarm for the electrical distribution equipment will be exceeded at a subsequent moment in time; and generating a notification based on the prediction.

8. The smart monitoring system of claim 7, further comprising one or more circuit breakers electrically connected to the electrical distribution equipment, and wherein the sensor data further comprises temperature data associated with the one or more circuit breakers.

9. The smart monitoring system of claim 8, wherein the sensor data further comprises vibration data associated with the one or more circuit breakers.

10. The smart monitoring system of claim 7, wherein the sensor data further comprises environmental data associated with ambient conditions of the electrical distribution equipment, and wherein the processor-executable instructions, when executed, further configure the diagnostics processor for generating a temperature and vibration model of the electrical distribution equipment as a function of the ambient conditions and the electrical load.

11. The smart monitoring system of claim 10, wherein the temperature and vibration model of the electrical distribution equipment defines, based on the sensor data and the load data, a predicted temperature and vibration response of the electrical distribution equipment over time in response to the ambient conditions and the electrical load.

12. The smart monitoring system of claim 11, wherein the predicted temperature and vibration response defines a normality space associated with the electrical distribution equipment, and wherein the processor-executable instructions, when executed, further configure the diagnostics processor for comparing the normality space to a temperature threshold corresponding to the predefined temperature alarm.

13. An electrical distribution system comprising:

one or more rigid electric load carrying components configured for supplying power to an electrical load;

a plurality of sensors configured to provide sensor data, the sensor data comprising temperature data associated with the one or more rigid electric load carrying components and vibration data indicating a self-induced vibration of the one or more rigid electric load carrying components;

a diagnostics processor receiving and responsive to the sensor data and to load data, the load data representative of the electrical load; and a memory coupled to the diagnostics processor, the memory storing a machine learned model that, when executed by the diagnostics processor:

processes the sensor data and the load data as inputs to the machine learned model to determine a prediction whether a predefined temperature alarm for the electrical distribution system will be exceeded at a subsequent moment in time; and causes a notification to be generated based on the prediction.

14. The electrical distribution system of claim 13, wherein at least one of the plurality of sensors is located at a joint between the rigid electric load carrying components and the sensor data further comprises vibration data indicating a self-induced vibration of the joint.

15. The electrical distribution system of claim 13, further comprising a gateway of a wireless communications network, wherein the diagnostics processor receives the sensor data from the sensors wirelessly via the gateway.

16. The electrical distribution system of claim 15, wherein the diagnostic processor is accessible through a cloud connection, linked to a separated offer, or available as a single service.

17. The electrical distribution system of claim 13, wherein the sensor data further comprises environmental data associated with ambient conditions of the electrical distribution system, and wherein the machine learned model comprises a predicted temperature and vibration response over time in response to the ambient conditions and the electrical load.

18. The electrical distribution system of claim 17, wherein the predicted temperature and vibration response defines a normality space associated with the electrical distribution system, and wherein the predefined temperature alarm is based on comparing the normality space to a temperature threshold.

19. The electrical distribution system of claim 18, wherein a specific pattern of temperature or vibration evolution is used to complete the predefined alarm thresholds.

* * * * *